(12) United States Patent
Horovitz

(10) Patent No.: US 8,893,074 B2
(45) Date of Patent: Nov. 18, 2014

(54) SOFTWARE DEVELOPMENT REQUIREMENTS RECORDING

(75) Inventor: Yair Horovitz, Mazkeret Batya (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 178 days.

(21) Appl. No.: 13/045,766

(22) Filed: Mar. 11, 2011

(65) Prior Publication Data
US 2012/0233583 A1    Sep. 13, 2012

(51) Int. Cl.
*G06F 9/44*    (2006.01)

(52) U.S. Cl.
CPC ........................................ *G06F 8/10* (2013.01)
USPC ........................................ 717/100; 717/123

(58) Field of Classification Search
None
See application file for complete search history.

(56) References Cited

U.S. PATENT DOCUMENTS

| | | | |
|---|---|---|---|
| 6,389,588 B1 * | 5/2002 | Wadhwa et al. | 717/106 |
| 7,721,264 B2 * | 5/2010 | Peterson et al. | 717/125 |
| 7,752,606 B2 | 7/2010 | Savage | |
| 7,861,158 B2 | 12/2010 | Martin et al. | |
| 8,356,098 B2 | 1/2013 | Herington | |
| 8,549,123 B1 | 10/2013 | Wilkinson et al. | |
| 8,555,048 B2 | 10/2013 | Goldstein et al. | |
| 2001/0002834 A1 * | 6/2001 | Mashita et al. | 345/418 |
| 2005/0144529 A1 * | 6/2005 | Gotz et al. | 714/38 |
| 2006/0117294 A1 | 6/2006 | Vogler | |
| 2007/0169006 A1 | 7/2007 | Arai | |
| 2007/0288888 A1 * | 12/2007 | Gentry et al. | 717/106 |
| 2008/0163157 A1 | 7/2008 | Atkin | |
| 2009/0150814 A1 * | 6/2009 | Eyer et al. | 715/765 |
| 2009/0187880 A1 | 7/2009 | Shields | |
| 2009/0192849 A1 * | 7/2009 | Hughes et al. | 705/7 |
| 2011/0035725 A9 * | 2/2011 | Naik et al. | 717/108 |
| 2012/0011455 A1 * | 1/2012 | Subramanian et al. | 715/764 |
| 2012/0227027 A1 * | 9/2012 | Boulila | 717/101 |

OTHER PUBLICATIONS

Google search results.*
ip.com search results.*
Mohammad El-Ramly, Eleni Stroulia, and Paul Sorenson. 2002. Recovering software requirements from system-user interaction traces. In Proceedings of the 14th international conference on Software engineering and knowledge engineering (SEKE '02). ACM, New York, NY, USA, 447-454.*
K. Crowston and E. E. Kammerer. 1998. Coordination and collective mind in software requirements development. IBM Syst. J. 37, 2 (Apr. 1998), 227-245.*
Kecheng Liu, Albert Alderson, and Zubair Qureshi. 1999. Requirements Recovery from Legacy Systems by Analyzing and Modelling Behavior. In Proceedings of the IEEE International Conference on Software Maintenance (ICSM '99). IEEE Computer Society, Washington, DC, USA.*
Kassel, Neil W. et al., "An Apporach to Automate Requirements Elicitation and Specification" Proceedings of the 7th IASTED International Conference Software Engineering and Applications, Nov. 3-5, 2003, Marina Del Rey, CA, USA.
Verma, Kumal et al., "Model-Assisted Software Development: Using a 'semantic bus' to automate steps in the software development process", 2010.
Zhu, Hong et al. "Automated RE Tools" Nov. 4, 2005. (http://cms.brookes.ac.uk/staff/HongZhu/RE.htm).
"System—Definition and More from the Free Merriam-Webster Dictionary", Merriam-Webster Online Dictionary, downloaded Dec. 26, 2013 © 2013 Merriam-Webster, Incorporated., http://www.merriam-webster.com/dictionary/system.
"System—Wikipedia, the free encyclopedia", Wikipedia, en.wikipedia.org/wiki/System, downloaded Dec. 26, 2013.

* cited by examiner

*Primary Examiner* — Don Wong
*Assistant Examiner* — Daxin Wu

(57) ABSTRACT

User interactions with an existing software product are recorded so as to generate a list of actions performed by or triggered by the interaction. The list of actions is then used to generate requirements for a new software product under development.

12 Claims, 3 Drawing Sheets

SOFTWARE DEVELOPMENT REQUIREMENTS RECORDING

BACKGROUND

A software development process typically progresses through a series of phases, e.g., requirements, design, implementation, verification, and maintenance phases. Since the remaining phases are built upon the results of the requirements phase, errors (e.g., omissions) in the requirements can be very costly. On the other hand, generation of a complete set of requirements can be challenging: 1) because of the complexity of the software being developed, and 2) due to the interdisciplinary nature of the communications (e.g., among software engineers, application domain experts, customers, users, etc.) used to define the requirements.

BRIEF DESCRIPTION OF THE DRAWINGS

The following figures represent examples or implementations of the invention and not the invention itself.

DETAILED DESCRIPTION

Figure 1:
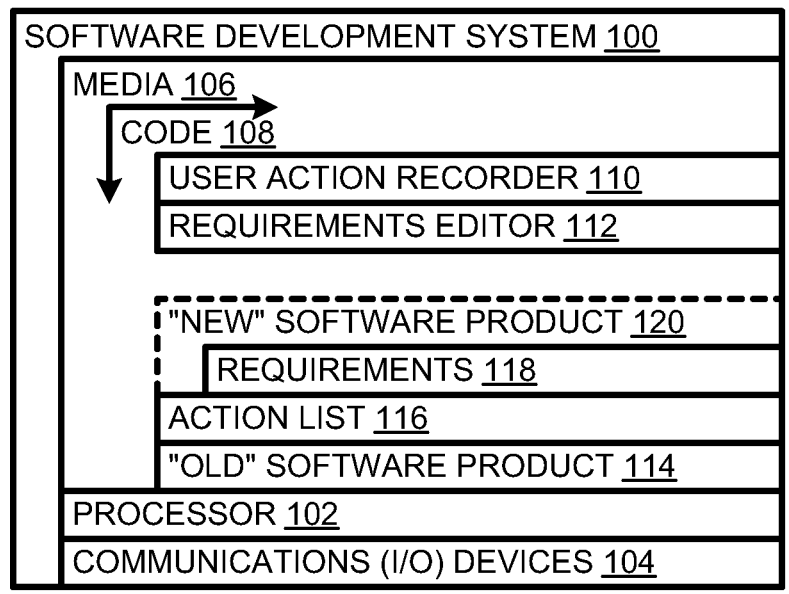
FIG. 1 is a schematic diagram of a software product development system.

A software development system 100, shown in FIG. 1, generates requirements for a "new" software product under development by recording user interactions with an existing "old" software product. This simplifies the process of generating requirements and ameliorates challenges involved in the interdisciplinary communications that typify a requirements phase.

Software development system 100 includes a computer having a processor 102, communications (including I/O) devices 104, and computer-readable storage media 106. Media 106 is encoded with code 108 defining a user-action recorder 110, a requirement editor 112, and an "old" existing software product 114. In addition, code 108 defines an action list 116 and requirements 118 for a "new" software product 120 under development.

Figure 2:
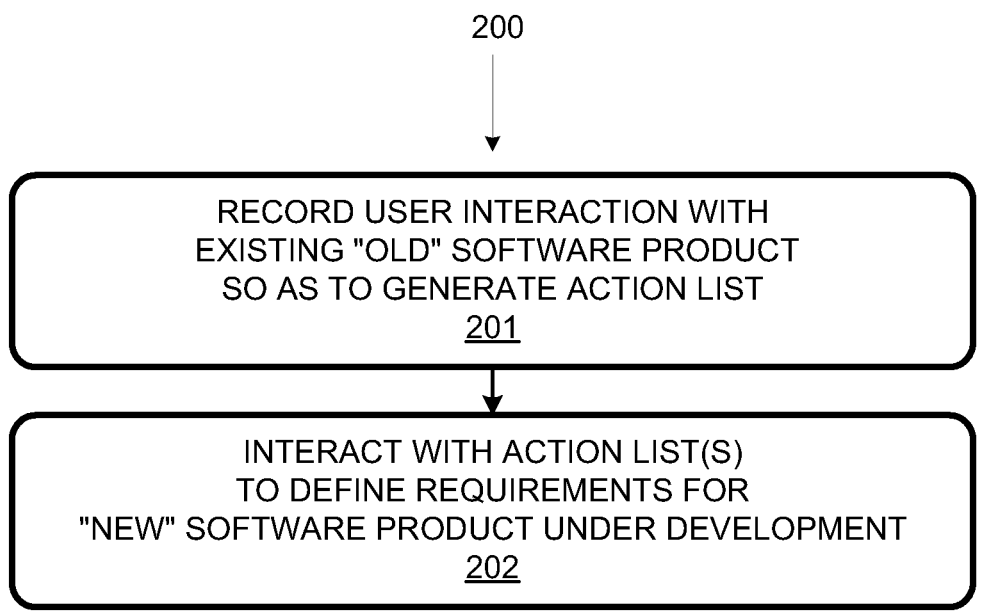
FIG. 2 is a flow chart of a software product development process implemented by the system of FIG. 1.

Code 108 is configured to, when executed by processor 102, implement a process 200, flow-charted in FIG. 2. At 201, user action recorder 110 records a user's interactions with old software product 114 so as to generate action list 116. At 202, a user interacts with action list 116 to define requirements 118 for new software product 120. Thus, development requirements are generated from an existing product rather than from scratch. Also, differences in perspective and terminology are minimized as requirements begin from a concrete representation of the requirements.

In one scenario, the new product under development is a new version of an existing product. The new product is to have all the functionality of the old product. In some cases, the new product is to match the functionality of the old product, e.g., is a higher-performance program with the same functionality or is compatible with a different operating environment. In other cases, the new product may be substantially different in purpose and function from the old product, but certain functionality of the old product is desired for the new product, e.g., the login functionality. In some cases, the imported functionality is to be kept unmodified, in other cases; the imported functionality is to be modified. For example, the login process for an old product may be adopted and then modified to allow retinal scans in place of passwords. In other scenarios, functionality is imported from two or more old products.

Figure 3:
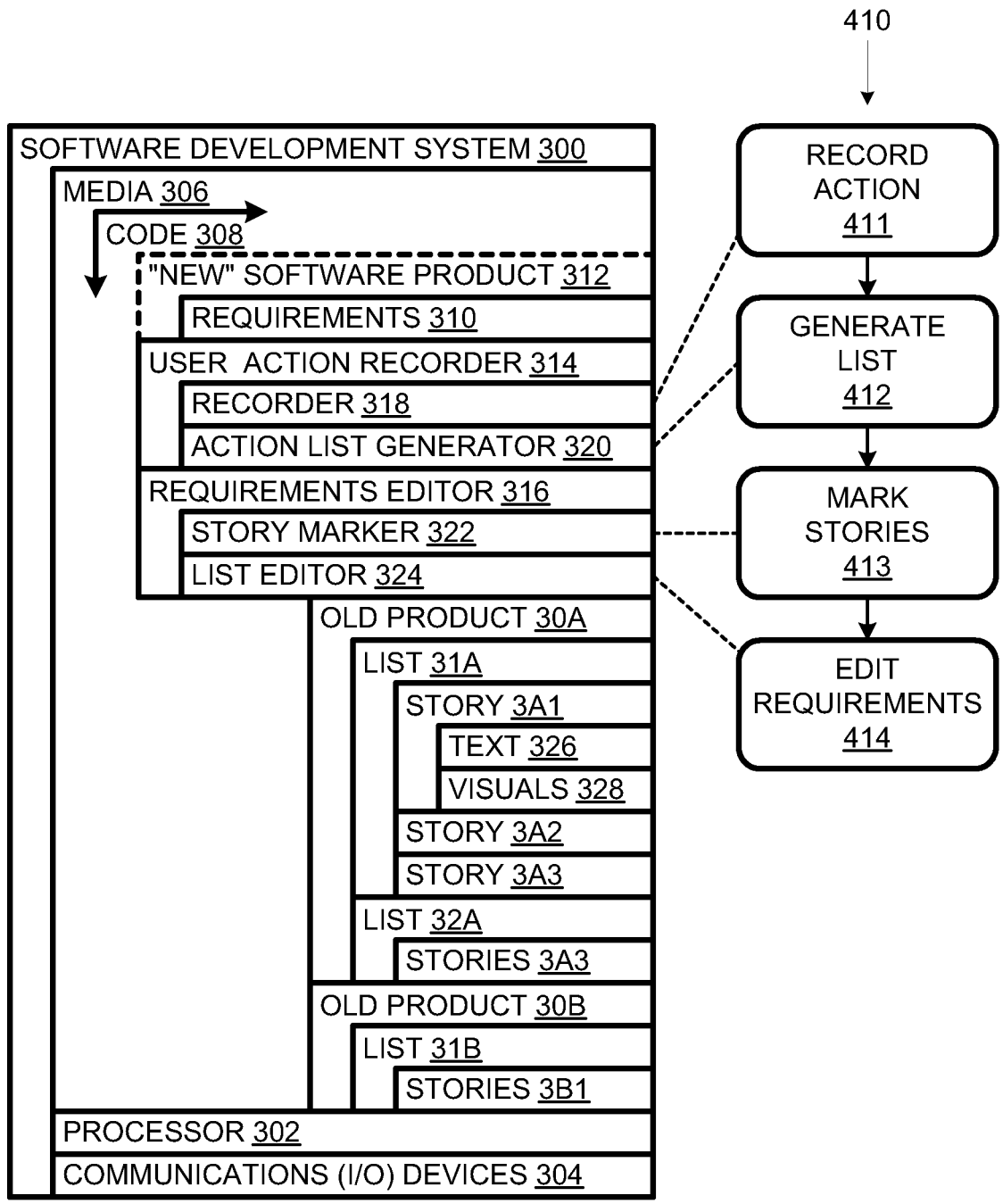
FIG. 3 is a schematic diagram of another software product development system.

Further features are described in the context of another software development system 300, shown in FIG. 3. System 300 includes a processor 302, communications (including input/output) devices 304, and computer-readable storage media 306. Media 306 is encoded with code 308 defining requirements 310 for a new software product 312, a user action recorder 314, a requirements editor 316, "old" existing software products 30A and 30B, and lists 31A, 31B, and 32A, as well as other software development tools and data. User action recorder 314 includes a recorder 318 and an action list generator 320. Requirements editor 316 includes a story marker 322 and a list editor 324.

Figure 4:
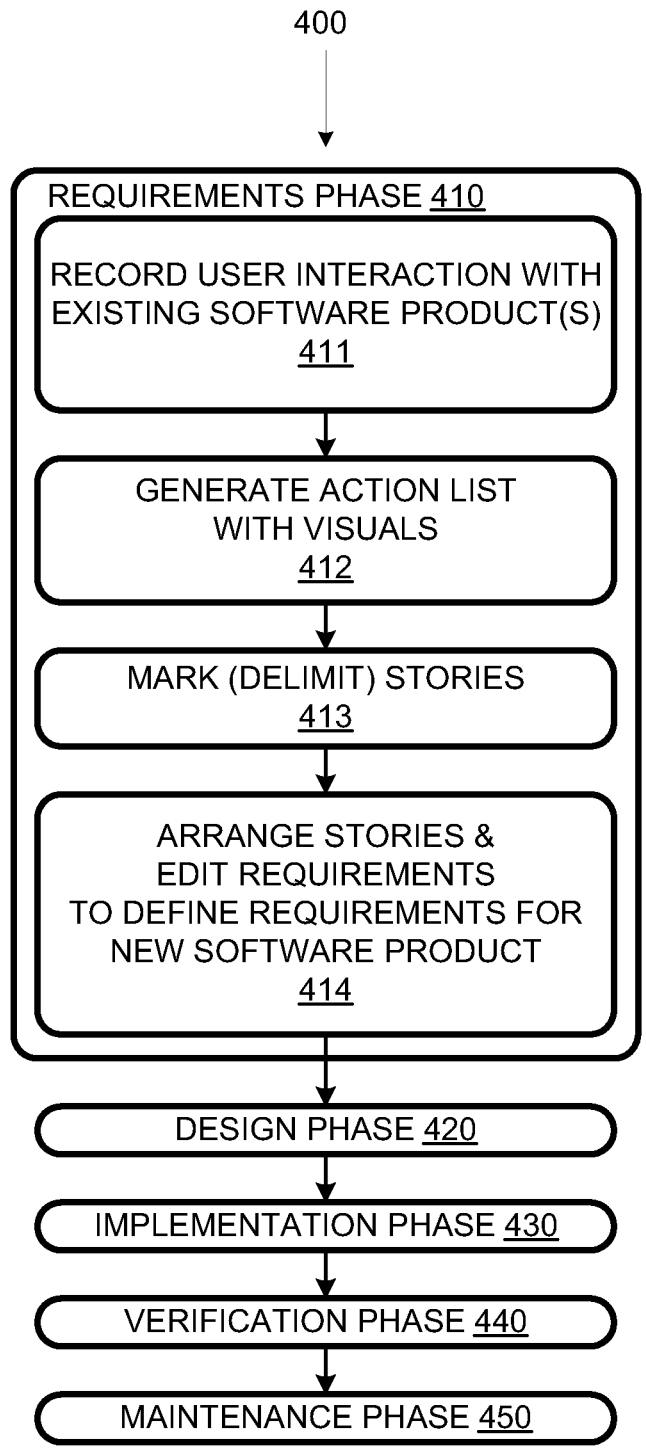
FIG. 4 is a flow chart of a software product development process implemented by the system of FIG. 3.

Code 308 is configured to, when executed by processor 302, implement a process 400, flow-charted in FIG. 4. Software development process 400 includes a requirements phase 410, a design phase 420, an implementation phase 430, a verification phase 440, and a maintenance phase 450.

User action recorder 314 records at 411 user interactions with existing software products, e.g., old products 30A and 30B and generates action lists based on the recordings. The user can be a human and/or a program or process. Recorder records actions performed by or triggered by the user. More specifically, recorder 318 records user interactions with existing software products, e.g., software products 30A and 30B. In various scenarios, user interactions with one, two, or more existing software products may be used to help generate requirements for a new software product.

Action list generator 320 generates at 412 one or more lists of actions. At least one list is generated for each existing product, but in some cases more than one list is generated for an existing product. For example, lists 31A and 31B are generated from existing software product 30A, whereas list 31B is generated for existing product 30B.

Requirements editor 316 is used at 413 to edit lists generated at 412. Story marker 322 is used to mark and delimit stories within action lists. For example, story marker 322 can be used to indicate within list 31A a series of list items to constitute a story 3A1, another series of list items to constitute a story 3A2, and a third series of list items to constitute a story 3A3. Likewise, story marker 322 can be used to demark stories 3A3 for list 32A and stories 3B1 for list 31B. Story marker 322 can define stories in a hierarchy; for example, stories can be arranged in "features", each containing plural stories, and the features can be arranged in "epics", each containing plural features.

Each story can include text and visuals, e.g., screen shots or video clips, to indicate the represented actions and the visual effects in which they result. The visuals are captured during the recording at 411 and are included in the lists generated at 412. Story marker 322 can also be used to label and annotate the images and the videos with identities and comments, e.g., using callouts, shapes, text boxes, and other graphic elements. List editor 324 can be used at 414 to arrange stories (e.g., in a sequence and/or hierarchy), to add descriptions of required modifications to a story, and to add requirements not represented in the stories. Intermediate and final versions of the requirements can be saved to central storage.

In some examples, the software development tools for all phases of software product development are presented in an integrated package; in others, separate or loosely integrated tools are used. Even within a phase, separate tools may be used. For example, one tool can do the recording, another tool can divide a recording into stories, and another tool can be used to edit a requirements list including the stories.

In the cases that separate tools are used, the results of one tool may be imported into another tool. For example, a recording can be imported into a story-splitting tool, which may also be an annotation tool. A list split into stories may be imported into a requirements editor, which can then rearrange stories, combine stories from different lists and from different old software products, and add additional requirements, e.g., using text and/or visual aids.

Herein, a "system" is a set of interacting non-transitory tangible elements, wherein the elements can be, by way of example and not of limitation, mechanical components, electrical elements, atoms, physical encodings of instructions, and process segments. Herein, "process" refers to a sequence of actions resulting in or involving a physical transformation. "Storage medium" and "storage media" refer to a system including non-transitory tangible material in or on which information is or can be encoded so as to be readable by a computer. "Display medium" and "display media" refer to storage media in which information is encoded in human readable form.

Herein, "machine", "device", and "computer" refer to hardware or a combination of hardware and software. However, a "virtual" machine, device or computer is a software analog or representation of a machine, device, or server, respectively, and not a "real" machine, device, or computer. A "server" is a real (hardware or combination of hardware and software) or virtual computer that provides services to computers. Herein, unless other apparent from context, a functionally defined component (e.g., recorder, editor, generator, marker) of a computer is a combination of hardware and software executing on that hardware to provide the defined functionality. However, in the context of code encoded on computer-readable storage media, a functionally-defined component can refer to software.

Herein, a computer is a machine having co-located or distributed components including computer-readable storage media, a processor, and one or more communications devices. The media stores or is configured to store code representing data including computer-executable instructions. The processor, which can include one or more central-processing units (CPUs), reads and manipulates data in accordance with the instructions. "Communication(s) device(s)" refers to computer-hosted devices used to transmit and/or receive data. Herein, a "computer network" is a network of communicatively coupled real and, in some cases, virtual nodes, wherein the nodes can be, by way of example and not of limitation, servers, network infrastructure devices, and peripherals. Herein, a "node" encompasses real and virtual devices.

In this specification, related art is discussed for expository purposes. Related art labeled "prior art", if any, is admitted prior art. Related art not labeled "prior art" is not admitted prior art. In the claims, "said" qualifies elements for which there is explicit antecedent basis in the claims; "the" refers to elements for which there is implicit antecedent basis in the claims; for example, the phrase "the center of said circle" indicates that the claims provide explicit antecedent basis for "circle", which also provides implicit antecedent basis for "center" since every circle contains exactly one center. The illustrated and other described examples ad implementations, as well as modifications thereto and variations thereupon are within the scope of the following claims.

What is claimed is:

1. A process comprising:
   recording user interactions with an existing first old software product so as to generate a first action list of actions performed in the course of said interactions and resulting visual effects; and
   editing said first action list to create or modify requirements for a new software product under development, said editing including splitting said first action list into stories, each of said stories including a series of list items, wherein said editing includes marking said first action list to delimit stories within said first action list, each of said stories corresponding to a different respective requirement for said new software product, and wherein said recording and editing are performed by a system including a computer.

2. A process as recited in claim 1 wherein said stories include visuals.

3. A process as recited in claim 2 wherein said recording generates a second action list from a recording of interactions with said first old software product, said requirements including stories from said first action list and said second action list.

4. A process as recited in claim 2 wherein said recording generates a second action list from a recording of interactions with a second old software product, said requirements corresponding to stories from said first action list and said second action list.

5. A system comprising:
   a user action recorder for recording user interactions with an existing first old computer product so as to generate a first action list including text and visuals respectively representing user actions performed in the course of said interactions and resulting visual effects; and
   a requirements editor providing for a user to edit said first action list by splitting said first action list into stories to create or update requirements in a requirements phase for a new software product under development, each of said stories including a series of list items, said user action recorder and said requirement editor being respective combinations of hardware and software executing on that hardware, wherein said requirement editor includes a story marker to delimit stories within said first action list and each of said stories corresponds to a different respective requirement for said new software product.

6. A system as recited in claim 5 wherein said stories include at least some of said visuals.

7. A system as recited in claim 6 wherein said requirements editor provides for including stories from said first action list and from a second action list obtained by recording user interactions with a second old software product different from said first old computer product.

8. A system as recited in claim 6 wherein said requirements editor is configured for editing a requirement based on one of said stories by annotating the story.

9. A system comprising non-transitory computer-readable storage media encoded with code that, when executed by a processor causes the processor to:
   record user interactions with an existing first old software product so as to generate a first action list including text and visuals representing actions performed by or triggered by said user and resulting visual effects; and
   edit said first action list so as to split said first action list lost into stories, to define requirements in a requirements phase for a new software product under development, each of said stories including a series of list items, wherein said editing includes marking said first action list to delimit stories within said first action list and each of said stories corresponds to a different respective requirement for said new software product.

10. A system as recited in claim 9 further comprising said processor.

11. A system as recited in claim 9 wherein said stories include at least some of said visuals.

12. A system as recited in claim 11 wherein the recording includes recording user interaction with a second old software product, generating a second action list from the interaction with said second old software product, and splitting said second action list into a second set of stories, said code being configured to define said requirements using stories from said first set and from said second set.

* * * * *